Patented Aug. 29, 1933

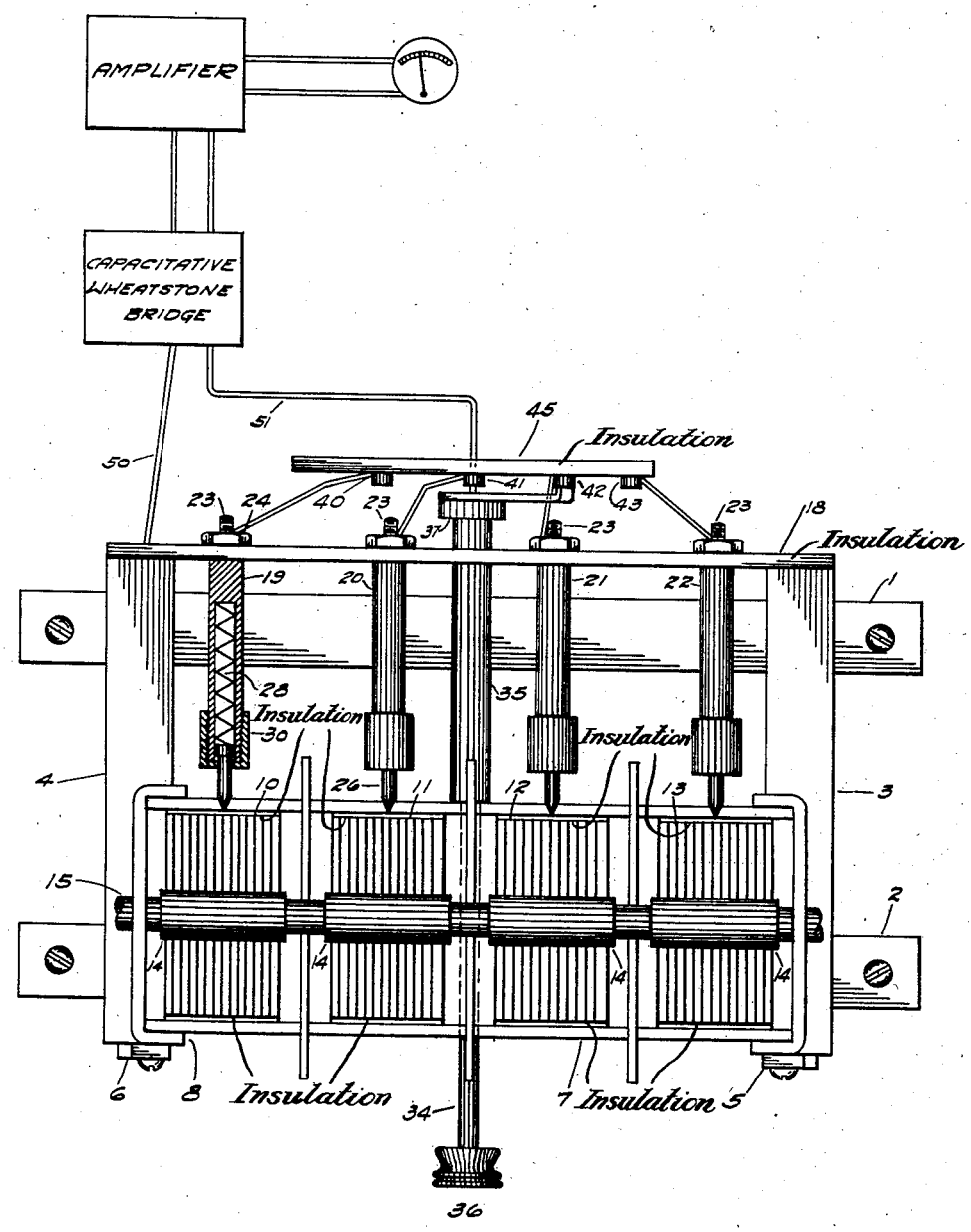

1,924,862

UNITED STATES PATENT OFFICE

1,924,862

ELECTRICAL APPARATUS

Mahlon W. Kenney, Elmhurst, Ill., assignor to Grigsby-Grunow Company, Chicago, Ill., a corporation of Illinois Application May 5, 1930. Serial No. 449,898

1 Claim. (Cl. 175—183)

This invention relates to electrical apparatus and particularly to a device for testing and aligning the capacities of the component units of gang condensers. In the manufacture of gang condensers for radio receiving sets, it is necessary that at least certain of the units have similar capacities within close limits throughout their entire range. In order to align such condensers it is customary to compensate for variation in capacities, by bending the end plates.

To conveniently operate on the condenser, it is desirable to have a simple and convenient mechanical supporting and electrical connecting device into which a gang condenser may be quickly placed for testing purposes. To this end I have devised a simple compact structure which supports the condenser and permits connection of any predetermined unit of the condenser to the testing circuit.

Referring to the drawing:

The single figure is a plan view looking down upon my invention.

The apparatus comprises a plurality of parallel spaced members 1 and 2 suitably bolted to a table or bench and rigidly supporting spaced cross members 3 and 4. Supported at one end of members 3 and 4 are perpendicular bars 5 and 6 adapted to support the sides of a gang condenser. This framework is preferably of metal. The gang condenser comprises a framework 8, adapted to support a plurality of stator blocks 10 to 13 inclusive.

A plurality of rotors 14 supported on a shaft 15 are rotatively supported by framework 8 and are adapted to be simultaneously operated to vary the relative position of rotors 14 and their cooperating stator blocks.

Cross members 3 and 4 support a bar 18, preferably of insulating material, into which are bolted a plurality of contact members 19 to 22 inclusive. Each of the contact members comprises a solid portion having a threaded end 23 projecting through a suitable aperture in member 18 and bolted in place by a nut 24. The other end of the contact member is provided with a resiliently mounted sharp pointed contact making member 26. Pointed member 26 is spring pressed by spring 28 within a cavity in member 19 and is maintained in place by a sleeve 30.

Gang condenser 7 rests on bars 3 and 4, while pointed members 26 press into stator blocks 10 to 13 inclusive. Vertical bars 5 and 6 support the sides of gang condenser 7 and maintain it in the cradle.

In order to make selective contact with each of the stator blocks an insulating shaft 34, in a sleeve 35, provided with a knob 36, carries a wiper 37 at one end. This wiper is adapted to connect pins 40—43, supported on a block 45, with contact members 19—22 inclusive.

Connections 50 and 51 are provided between wiper 37 and the cradle to a capacitative Wheatstone bridge shown diagrammatically. The opposite junctions of the bridge are connected to an amplifier, the output of which goes to an ammeter.

A condenser is placed in the cradle and contact members 19 to 22 inclusive are adjusted to bear upon the corresponding stator blocks. Wiper 37 is connected to any one of the stator blocks by means of pins 40 to 43 inclusive. With the testing apparatus connected in circuit the meter will give a certain reading. The rotor is then turned through predetermined angles and other readings taken. Knob 36 is then turned to connect a different stator with the testing circuit. Readings are then taken with corresponding rotor positions. If the readings are substantially different from the rotor adopted as a standard, a portion of the end plate of the rotor or stator in question may be deformed sufficiently so that a correct reading is obtained. In this way each unit may be tested in turn against the one adopted as a standard.

I claim:

A gang condenser testing cradle comprising a frame-work including a pair of spaced metallic bars, upon which the ends of said condenser rest to support the entire condenser, an insulating strip mounted on said framework lying parallel to the length of the gang condenser in normal testing position, a plurality of spring-pressed contact members, each one adapted to make contact with a stator of the condenser gang and a switching mechanism supported on said cradle for connecting any one of said stators to a testing circuit, said switching mechanism comprising a shaft supported on said framework transverse to the length of the gang condenser and a movable contact at one end thereof adapted to co-operate with suitable fixed contacts, whereby said switch may be operated from the front of the cradle.

MAHLON W. KENNEY.